United States Patent Office 3,463,778
Patented Aug. 26, 1969

3,463,778
SUBSTITUTED 2,3-DIHYDRO-4(1H)-QUINAZOLINONES
Harry L. Yale, New Brunswick, N.J., assignor to E. R. Squibb & Sons Inc., New York, N.Y., a corporation of Delaware
No Drawing. Filed Jan. 13, 1967, Ser. No. 608,989
Int. Cl. C07d 51/48; A61k 27/00; A01n 9/22
U.S. Cl. 260—251                                    2 Claims

ABSTRACT OF THE DISCLOSURE

This invention relates to novel substituted 2,3-dihydro-4(1H)-quinazolinones, which have shown activity in inhibiting the multiplication of Earle's L cell line of mouse fibro blasts growing in suspension.

---

This invention relates to novel substituted 2,3-dihydro-4(1H)-quinazolinones of the formula (I)

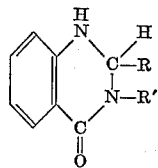

wherein R is selected from the group consisting of phenyl, o-chlorophenyl, p-chlorophenyl, trans-2-phenethenyl and 2-thenyl and R' is selected from the group consisting of hydrogen and 2,6-xylyl, provided that R' is 2,6-xylyl only when R is phenyl.

Compounds of this invention have shown a high degree of activity in inhibiting the multiplication of Earle's L cell line of mouse fibroblasts, growing in suspension, according to the test procedure of Perlman, et al., Proc. Soc. Exptl. Biol. Med., 102, 290 (1959). The following table illustrates the activities of the compounds of this invention in inhibiting such growth:

Table

| Compound of example | $ED_{50}$—mcg./ml.[1] |
|---|---|
| 1 | 2.5 |
| 2 | 2.5 |
| 3 | 0.5 |
| 4 | 6.0 |
| 5 | 5.0 |

[1] The concentration resulting in 50% inhibition of normal multiplication.

The compounds of this invention corresponding to Formula I are prepared in accordance with the following reaction schema:

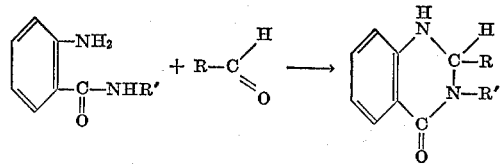

wherein R and R' are as hereinbefore defined.

In the preparation of all compounds of Formula I by the above reaction schema, the reaction proceeds smoothly, under reflux, in the presence of an alcohol, e.g., methanol, ethanol, 2-propanol or n-propanol as solvent and an alkaline catalyst, e.g., sodium hydroxide or potassium hydroxide.

The preparation of the compounds of this invention is further illustrated by the following examples. All temperatures are in degrees centigrade.

Example 1.—2,3-dihydro-2-(o-chlorophenyl)-4(1H)-quinazolinone

To a solution of 4.1 g. of 2-aminobenzamide and 4.6 g. of o-chlorobenzaldehyde in 25 ml. of 95% ethanol is added 2.0 ml. of 20% aqueous sodium hydroxide. This mixture is heated under reflux for one hour, cooled and the precipitated solid filtered and air-dried to give 7.3 g. of crude product. Recrystallization from 600 ml. of 2-propanol gives 6.1 g. of desired product, M.P. 209–211°.

Example 2.—2,3-dihydro-2-(p-chlorophenyl)-4(1H)-quinazolinone

Following the procedure of Example 1 employing 4.1 g. of 2-aminobenzamide but substituting 4.6 g. of p-chlorobenzaldehyde, there is obtained 6.9 g. of crude product. Recrystallization gives 5.4 g. of the desired product, M.P. 205–208°.

Example 3.—2,3-dihydro-2-(trans-phenethenyl)-4(1H)-quinazolinone

Following the procedure of Example 1 employing 10.9 g. of 2-aminobenzamide but substituting 10.6 g. of trans-cinnamaldehyde, there is obtained 10.0 g. of crude product. Recrystallization gives 7.7 g. of the desired product, M.P. 168–172°.

Example 4.—2,3-dihydro-2-(2-thenyl)-4(1H)-quinazolinone

Following the procedure of Example 1 employing 4.1 g. of 2-aminobenzamide but substituting 3.8 g. of 2-thenaldehyde, there is obtained 6.1 g. of crude product. Recrystallization gives 5.2 g. of the desired product, M.P. 213–216°.

Example 5.—2,3-dihydro-2-phenyl-3-(2,6-xylyl)-4(1H)-quinazolinone (a) 2-amino-N-(2,6-xylyl)benzamide, M.P. 128–130° is prepared by the following synthetic sequence: o-nitrobenzoyl chloride is reacted with 2,6-xylylamine to give 2-nitro-N-(2,6-xylyl)benzamide, M.P. 210–211° and this is reduced with hydrogen over a palladium catalyst to give the desired 2-amino-N-(2,6-xylyl)benzamide.

(b) Following the procedure of Example 1 but substituting 7.2 g. of the 2-amino-N-(2,6-xylyl)benzamide for the 2-aminobenzamide and 3.5 g. of benzaldehyde for the o-chlorobenzaldehyde, there is obtained 6.8 g. of crude product. Recrystallization gives 6.2 g. of the desired product, M.P. 219–222°.

What is claimed is:
1. 2,3-dihydro-2-(2-thenyl)-4(1H)-quinazolinone.
2. 2,3 - dihydro - 2 - phenyl-3-(2,6-xylyl)-4(1H)-quinazolinone.

References Cited

UNITED STATES PATENTS 3,162,636   12/1964   Gurien et al. _____ 260—251

OTHER REFERENCES

C.A. 51, 13869g (1957) Smith et al.
Russo et al.: C.A. 66, 18696d (1967).

ALEX MAZEL, Primary Examiner
R. V. RUSH, Assistant Examiner

U.S. Cl. X.R.
260—999.